United States Patent [19]

Tsushima et al.

[11] 4,445,279
[45] May 1, 1984

[54] MAGNETIC COURSE DETECTOR

[75] Inventors: Noboru Tsushima, Morioka; Masashi Fuse, Tamayama; Toshio Sasaki, Yokohama; Masayuki Ogata, Yokohama; Teruo Mimori, Yokohama; Tadashi Mukai, Tokyo, all of Japan

[73] Assignee: Alps Electric Co., Ltd., Japan

[21] Appl. No.: 408,000

[22] Filed: Aug. 13, 1982

[30] Foreign Application Priority Data

Aug. 13, 1981 [JP] Japan ................................ 56-127582

[51] Int. Cl.³ ............................................ G01C 17/38
[52] U.S. Cl. ...................................... 33/356; 33/361; 33/363 Q
[58] Field of Search ...................... 33/361, 355 R, 356, 33/357, 358, 359, 363 K, 363 Q

[56] References Cited

U.S. PATENT DOCUMENTS

| 3,744,312 | 7/1973 | Anderson | 33/356 |
| 3,991,361 | 11/1976 | Mattern et al. | 33/356 |
| 4,024,382 | 5/1977 | Fowler | 33/356 |
| 4,112,755 | 9/1978 | Sullivan | 33/356 |
| 4,277,751 | 7/1981 | Lawson et al. | 33/361 |

Primary Examiner—Willis Little
Attorney, Agent, or Firm—Guy W. Shoup

[57] ABSTRACT

Disclosed is a magnetic course detector capable of accurately detecting the bearing of the course of a traveling body independently of the position a magnetic bearing sensor is installed in the traveling body through rotatably mounting the magnetic bearing sensor and making corrections for the offset and sensitivity of its output.

10 Claims, 22 Drawing Figures

Fig. 7
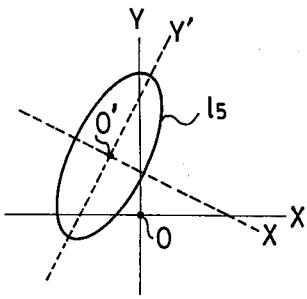
Fig. 8(A)    Fig. 8(B)
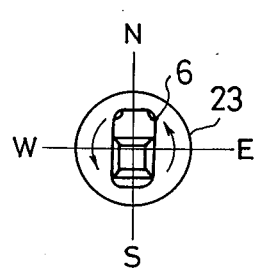 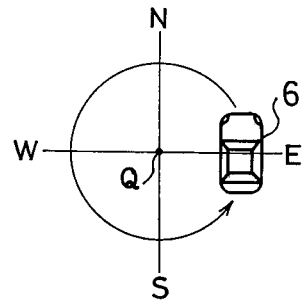
Fig. 9(A)
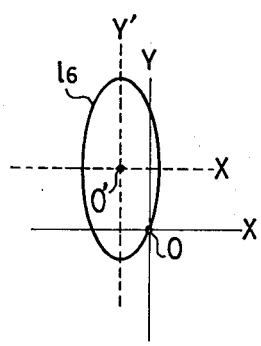
Fig. 9(B)    Fig. 9(C)
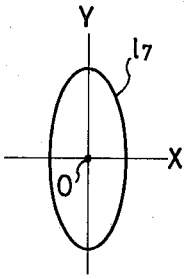 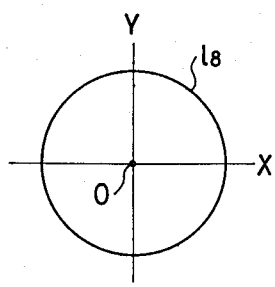

MAGNETIC COURSE DETECTOR

BACKGROUND OF THE INVENTION

1. Field of the Invention

The present invention relates to a magnetic course detector, wherein the bearing of the course of a traveling body, especially for example an automobile, is detected by detecting the direction of the terrestrial magnetism by means of a magnetic bearing sensor mounted in the traveling body, characterized in that the bearing of the course of the traveling body is accurately detected by regulating the offset and sensitivity of the output of the abovementioned magnetic bearing sensor as well as rotatably mounting the same.

2. Description of the Prior Art

It has hitherto been contrived to detect the bearing of the course of a traveling body by detecting the direction of the terrestrial magnetism using a magnetic bearing sensor detecting the direction of the magnetic field, such as shown in FIG. 1 (A). In what is called a fluxgate magnetic bearing sensor 1 shown in FIG. 1 (A), an exciter coil 3 wound on a ring core 2 is supplied an alternating current of frequency f in order to excite the ring core 2 so that it is repeatedly saturated and unsaturated. In this state, if a magnetic field (terrestrial magnetism in this case) having a magnetic field intensity He is applied as shown in FIG. 1 (A), higher harmonics of frequency 2f and proportional to the magnetic field intensity He are generated in detection coils 4a, 4b crossing each other at right angles, and detection circuits 5a, 5b generate positive and negative DC voltages $V_X$, $V_Y$ proportional to the magnetic field intensity He. The generated voltages or the outputs $V_X$ and $V_Y$ of the abovementioned magnetic bearing sensor 1 are the X-axis and Y-axis components of the terrestrial magnetism vector He respectively, and they are given by the formulas:

$$\left. \begin{array}{l} V_X = KHe \cdot \sin\theta \\ V_Y = KHe \cdot \cos\theta \end{array} \right\} \quad (1)$$

where K is a constant of proportionality. Then, if the magnetic bearing sensor 1 is rotated 360° with respect to the direction of the terrestrial magnetism, the locus obtained by the outputs $V_X$ and $V_Y$ of the magnetic bearing sensor 1 is a circle $l_1$, as shown in FIG. 1 (B), given by the formula:

$$V_X^2 + V_Y^2 = (KHe)^2 = a^2 \quad (2)$$

Accordingly, the direction of the terrestrial magnetism, or a magnetic north, can be obtained by means of the outputs $V_X$ and $V_Y$ of the magnetic bearing sensor 1. Thus, if, the Y-axis direction, for example, of the magnetic bearing sensor 1 is made to coincide with the course of the traveling body, the bearing of the course of the traveling body with respect to magnetic north can be known.

When the above-mentioned magnetic bearing sensor 1 is mounted in a vehicle formed from iron plates such as an automobile, however, the X-Y outputs of the magnetic bearing sensor 1 may be offset due to residual magnetism in the iron plates or the like forming the vehicle due to magnetization of these parts when assembling the vehicle. In other words, the origin O of the X-Y outputs of the magnetic bearing sensor 1 is shifted to the point O' shown in FIG. 2 by the residual magnetism vector, represented by arrow Hr. As a result, the locus of the outputs ($V_X$, $V_Y$) of the magnetic bearing sensor 1 on the basis of the terrestrial magnetism vector He is such as $l_2$ shown in FIG. 2. Consequently, even though the direction of the terrestrial magnetism vector He is the direction of an arrow $\overrightarrow{O'P}$ in the Figure, the bearing vector obtained by the outputs of the magnetic bearing sensor 1 becomes a composite vector (vector OP in FIG. 2) of the abovementioned residual magnetism vector Hr and the terrestrial magnetism vector He, and so it is impossible to accurately detect the direction of the terrestrial magnetism.

In addition, even if a correction is made for the effects of the abovementioned residual magnetism, the anisotropy of magnetic permeability, i.e. how easy it is for magnetic flux to pass, attributable to the configuration of a vehicle with an iron-plate structure, results in the intensity of the terrestrial magnetism differs according to the direction of incidence of the terrestrial magnetism. Consequently, the output values of the magnetic bearing sensor 1 vary, so that normal outputs cannot be obtained. In other words, as shown in FIGS. 3 (A), (B), a vehicle 6 such as an automobile has a generally rectangular plan, so that it is easy for magnetic flux 7 to pass through the vehicle 6 in its longitudinal direction as shown in FIG. 3 (A) but difficult in its lateral direction as shown in FIG. 3 (B). Accordingly, when the magnetic bearing sensor 1 is mounted in the vehicle 6 so that the Y direction of the magnetic bearing sensor 1 coincides with the longitudinal direction or the traveling direction of the vehicle 6 as shown in the Figure, the locus of the outputs obtained from the magnetic bearing sensor 1 is not a correct circle, and it is experimentally known that the locus of the outputs of the magnetic bearing sensor 1 obtained when the vehicle 6 turns 360° with respect to the direction of the terrestrial magnetism is an ellipse with a major axis in the Y direction, such as $l_3$ shown in FIG. 3 (C). In other words, because the detection sensitivity in the X direction of the magnetic bearing sensor 1 is low, it is impossible to accurately detect the magnetic bearing without suitable improvements.

Moreover, depending on the position the magnetic bearing sensor 1 is installed in the vehicle 6, the aforementioned magnetic permeability differs, so that the effect of the anisotropy thereof becomes complicated. For example, when the magnetic bearing sensor 1 is installed in the right rear corner of the vehicle 6 as shown in FIG. 4, it is easiest for the magnetic flux 7 to pass the vehicle 6 when crossing it from the left rearward to the right frontward as shown in FIG. 4 (B), while it is most difficult for the magnetic flux 7 to pass the vehicle 6 when it is turned 90° counterclockwise from the state shown in FIG. 4 (B), as shown in FIG. 4 (C). From the above, when the magnetic bearing sensor 1 is positioned in the vehicle 6 as shown in FIG. 4, the locus of the outputs of the magnetic bearing sensor 1 obtained when the vehicle 6 turns 360° with respect to the direction of terrestrial magnetism (the direction of the magnetic flux 7) is an ellipse like $l_4$ shown in FIG. 5. In other words, as described above, because the state shown in FIG. 4 (B) where the magnetic flux 7 passes most easily is the case where the course of the vehicle 6 is counterclockwise offset from the direction of the magnetic flux 7 by an angle $\theta$, a locus such as the ellipse $l_4$ is obtained, whose major axis is clockwise inclined at an angle θ with respect to the Y axis. Accordingly, when the position of the magnetic bearing sensor 1 is installed in the vehicle is asymmetric with respect to the vehicle as shown in FIG. 4, for example, it is impossible to accurately detect the magnetic bearing without a suitable improvement.

SUMMARY OF THE INVENTION

It is, therefore, an object of the present invention to provide a magnetic course detector capable of accurately detecting the bearing of the course of a traveling body independently of the position the magnetic bearing sensor is installed in the traveling body by making corrections for the offset and sensitivity of the output of the magnetic bearing sensor and to mount it rotatably, thereby overcoming the above-mentioned problems of the prior art.

BRIEF DESCRIPTION OF THE DRAWINGS

FIGS. 7 thru 9 illustrate the operation of the preferred embodiment shown in FIG. 6, respectively;

DESCRIPTION OF THE PREFERRED EMBODIMENTS

Preferred embodiments of the present invention will now be described with reference to the accompanying drawings.

Figure 6:
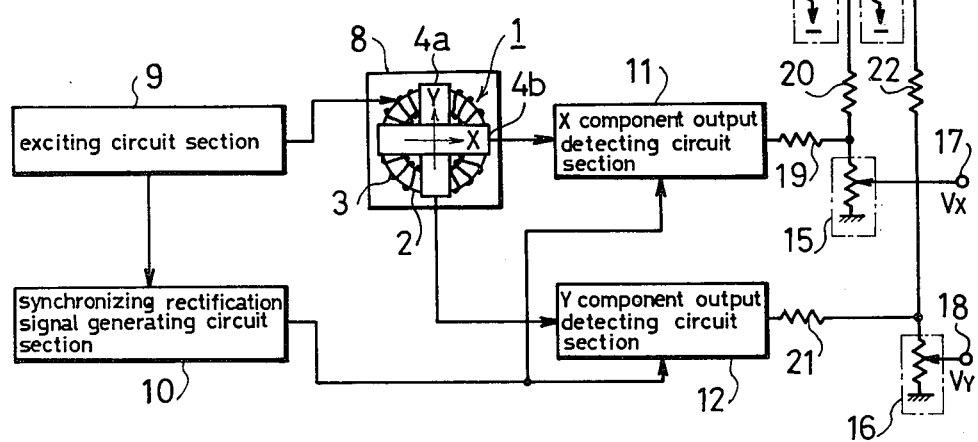
FIG. 6 is a block diagram showing the constitution of a preferred embodiment of the present invention.
Figure 10:
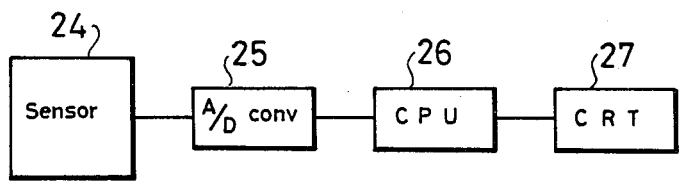
FIG. 10 is a block diagram showing the constitution of another preferred embodiment of the present invention.
Figure 11A:
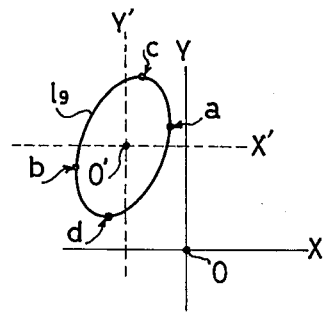
FIG. 11 illustrates the operation of the preferred embodiment shown in FIG. 10.
Figure 11B:
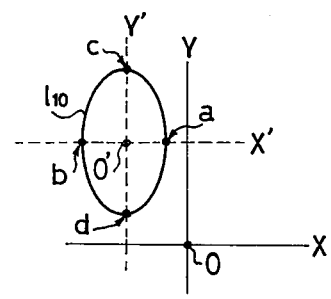
Figure 11C:
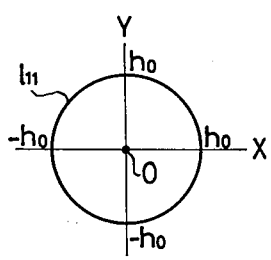
Figure 12:
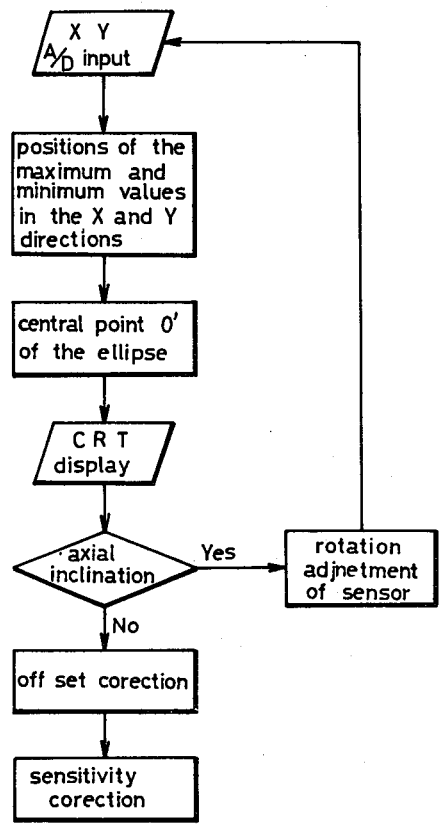
FIG. 12 is a flow chart showing the operation of the preferred embodiment shown in FIG. 10.

FIG. 6 is a block diagram showing the constitution of a preferred embodiment of the present invention; FIGS. 7 thru 9 illustrate the operation of the preferred embodiment shown in FIG. 6, respectively; FIG. 10 illustrates the constitution of another preferred embodiment of the present invention; FIG. 11 illustrates the operation of the preferred embodiment shown in FIG. 10; and FIG. 12 is a flow chart illustrating the operation of the preferred embodiment shown in FIG. 10.

Figure 1A:
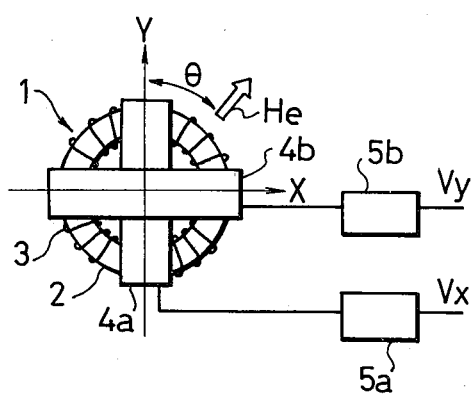
FIGS. 1 (A), (B) are illustrations of an example of a magnetic bearing sensor used in preferred embodiments of the present invention.
Figure 1B:
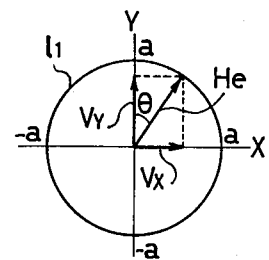
Figure 2:
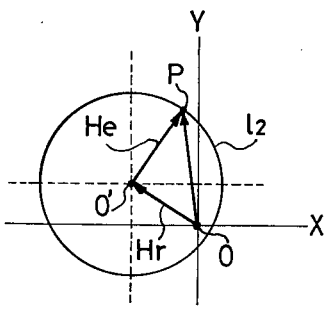
FIG. 2 illustrates the offset of the outputs of the magnetic bearing sensor.
Figure 3A:
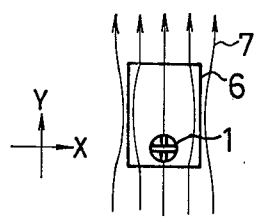
FIGS. 3 thru 5 illustrate how the locus of the outputs of the magnetic bearing sensor mounted in a traveling body changes, respectively.
Figure 3B:
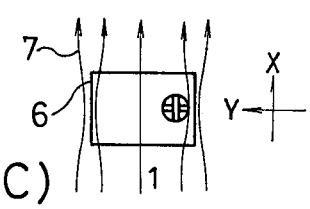
Figure 3C:
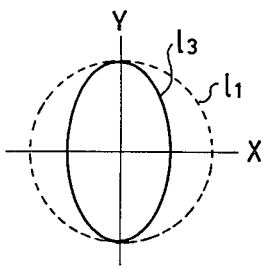
Figure 4A:
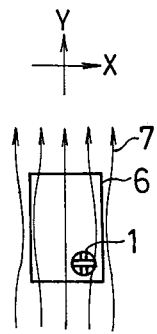
Figure 4B:
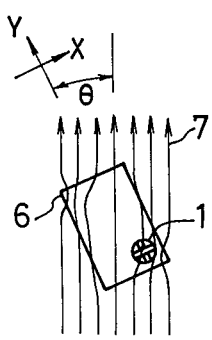
Figure 4C:
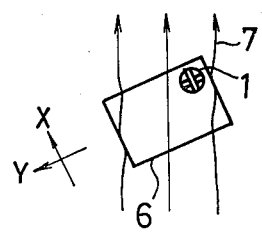
Figure 5:
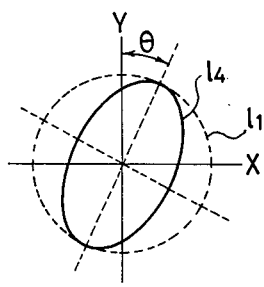

In FIG. 6 showing a preferred embodiment of the present invention, reference numerals 1 thru 5 correspond to those in FIG. 1 (A), and a sensor head section 8 is adapted to make a magnetic bearing sensor 1 rotatable. An exciting circuit section 9 is adapted to generate AC signals to make a ring core 2 periodically magnetically saturated and unsaturated, while a synchronizing rectification signal generating circuit section 10 is adapted to generate a synchronizing rectification reference signal is based on AC signals generated in the exciting circuit section 9. An X component output detecting circuit section 11 is adapted to convert the X component output from a detection coil 4b into a DC voltage by means of the synchronizing rectification reference signal from the synchronizing rectification signal generating circuit section 10, and reference numeral 12 designates a Y component output detecting circuit section. An X component offset regulating section 13 is adapted to apply a given bias voltage to the DC voltage from the X component output detecting circuit section 11, and a reference numeral 14 denotes a Y component offset regulating section. An X component sensitivity regulating section 15 is adapted to regulate the sensitivity of the X component output, and reference numeral 16 designates a Y component sensitivity regulating section. Reference numerals 17 and 18 denote an X component output terminal and a Y component output terminal respectively, and reference numerals 19 thru 22 designate resistors, respectively.

As described in the introductory portion of this specification with reference to FIG. 1, the direction of the terrestrial magnetism can be detected by means of the magnetic bearing sensor 1. As mentioned above with reference to FIGS. 2 thru 5, however, when the magnetic bearing sensor 1 is mounted in a traveling body made of iron plates, such as an automobile, the locus of the terrestrial magnetism vector obtained when the direction of the terrestrial magnetism turns 360° with respect to the magnetic bearing sensor 1 becomes such an ellipse $l_5$ as shown in FIG. 7 owing to the residual magnetism and the anisotropy of magnetic permeability. In other words, owing to the residual magnetism, the origin O may shift to O′, and owing to the anisotropy of the magnetic permeability, undesirable phenomena may occur such that the locus becomes an ellipse unlike the locus $l_1$, which is a circle, of the terrestrial magnetism vector He shown in FIG. 1 (B), or the major axis of the ellipse inclines. The detector embodying the present invention has a function of correcting the abovementioned undesirable conditions in order to accurately detect the direction of the terrestrial magnetism. The operation of the preferred embodiment shown in FIG. 6 will be described hereinunder:

In FIG. 6, first, a locus display device (not shown), e.g., an X-Y recorder, an oscilloscope, or the like is connected to the X component output terminal 17 and the Y component output terminal 18. Then, the vehicle 6 is turned 360° by a means such as mentioned below with reference to FIG. 8, and a locus such as the ellipse $l_5$ shown in FIG. 7 is obtained. The vehicle 6 may be turned in place on a turntable 23 formed from a non-magnetic material as shown in FIG. 8 (A) or may be driven around an arbitrary point Q.

The preferred embodiment shown in FIG. 6 is to effect regulation for correction on the basis of a locus displayed on the abovementioned locus display device, such as the locus $l_5$ shown in FIG. 7. The regulation is performed as follows:

(1) The sensor head section 8 shown in FIG. 6 is rotated until the Y direction of the magnetic bearing sensor 1 coincides with the direction of the highest magnetic permeability of the vehicle 6. In other words, the sensor head section 8 is rotated so that the Y axis in FIG. 7 is parallel to the major axis Y′ of the locus (ellipse) $l_5$. By this regulation, when the vehicle 6 is turned 360° again as shown in FIG. 8, an elliptical locus $l_6$ whose major axis Y′ is parallel to the Y axis is obtained, as shown in FIG. 9 (A).

(2) Next, the center O′ of the abovementioned elliptical locus $l_6$ and the origin O of the X-Y axes are made to coincide with each other. In other words, regulation is effected to make the X-Y axes and X′-Y′ axes coincide with each other. The regulation is performed by regulating the volume of the X component offset regulating section 13 and of the Y component offset regulating section 14 shown in FIG. 6. As a result, an elliptical locus l₇ shown in FIG. 9 (B) is obtained as the locus resulting from the outputs $V_X$ and $V_Y$ obtained when the vehicle 6 is turned 360° similarly to the abovementioned regulation (1). (3) Finally, the volume of each of the X component sensitivity regulating section 15 and the Y component sensitivity regulating section 16 shown in FIG. 6 is regulated so that the maximum values of the outputs in the X and Y directions are made equal to each other. As a result, the locus obtained from the outputs $V_X$ and $V_Y$ obtained when the vehicle 6 is turned 360° is a circle such as locus l₈ shown in FIG. 9 (C).

By effecting the abovementioned regulations (1) thru (3), i.e., corrections for the effects of the aforementioned residual magnetism and the anisotropy of magnetic permeability, the direction of the terrestrial magnetism can be accurately detected based on the outputs $V_X$ and $V_Y$ from terminals 17 and 18 shown in FIG. 6. Accordingly, the bearing of the course of the vehicle 6 at its present position can be accurately known.

In the preferred embodiment shown in FIG. 6, described above, an analog correction is effected by means of a manual operation. It is, however, also possible to perform a digital automatic correction employing an A/D converter and a CPU. Another preferred embodiment of the present invention having a function of performing such an automatic correction will now be described with reference to FIGS. 10 thru 12.

In FIG. 10 showing the basic constitution of another preferred embodiment of the present invention, a magnetic bearing sensor unit 24 comprises the same sections designated by reference numerals 1 thru 12 in the constitution of the abovementioned preferred embodiment shown in FIG. 6, i.e., the magnetic bearing sensor 1 thru the Y component output detecting circuit section 12. Moreover, an A/D converter 25 is adapted to convert the outputs of the magnetic bearing sensor unit 24, i.e., the outputs $V_X$, $V_Y$ of the X component output detecting circuit section 11 and the Y component output detecting circuit section 12, respectively, shown in FIG. 6, into digital signal, and reference numerals 26 and 27 denote a CPU and a CRT respectively.

In FIG. 10, the abovementioned bearing outputs $V_X$, $V_Y$ of the magnetic bearing sensor unit 24 are converted into digital signals in the A/D converter 25 before being displayed on the CRT 27 through the CPU 26. Now, if the terrestrial magnetism vector locus, displayed on the CRT 27, resulting from the bearing outputs $V_X$, $V_Y$ obtained when the vehicle 6 is turned 360° is, for example, an ellipse such as l₉ shown in FIG. 11 (A), it is necessary to effect a correction similar to that in the embodiment of FIG. 6. This correction process will be now described with reference to the flow chart shown in FIG. 12.

(i) All the outputs $V_X$, $V_Y$ from the magnetic bearing sensor unit 24 are converted into digital signals in the A/D converter 25 and successively sent to the CPU 26. In this case, the digital signals sent to the CPU 26 are, needless to say, signals corresponding to the X and Y coordinates of the ellipse l₉ shown in FIG. 11 (A).

(ii) Next, in the CPU 26, the following values are selected from all of the abovementioned digital signals: a maximum value in the X direction $V_{Xmax}$, i.e., the X coordinate value of the point shown by arrow a in FIG. 11; a minimum value in the X direction $V_{Xmin}$, i.e., the X coordinate value of the point shown by arrow b in FIG. 11; a maximum value in the Y direction $V_{Ymax}$, i.e., the Y coordinate value of the point shown by arrow c in FIG. 11; and a minimum value in the Y direction $V_{Ymin}$, i.e., the Y coordinate value of the point shown by arrow d in FIG. 11.

(iii) Next, on the basis of the maximum and minimum values in the X and Y directions, respectively, obtained by the abovementioned process (ii), the coordinates ($O'_X$, $O'_Y$) of the central point $O'$ of the ellipse l₉ shown in FIG. 11 are obtained by means of operational processing according to the following formulas:

$$O'_X = \frac{V_{Xmax} + V_{Xmin}}{2}$$

$$O'_Y = \frac{V_{Ymax} + V_{Ymin}}{2}$$

(iv) Then, the positions of the maximum and minimum values in the X and Y directions (points a, b, c and d shown in FIG. 11 (A)), obtained by the abovementioned process (ii), and coordinate axes X', Y' whose origin is the central point $O'$ ($O'_X$, $O'_Y$) of the ellipse l₉ obtained by the abovementioned process (iii) and which are parallel to the abovementioned X and Y axes respectively, are displayed on the CRT 27. In this case, when the ellipse l₉ is inclined as shown in FIG. 11 (A), the points a thru d are not on the X' and Y' axes, but when the ellipse l₁₀ is not inclined as shown in FIG. 11 (B), the points a thru d are on the respective X' and Y' axes.

(v) In other words, whether the ellipse is inclined or not can be judged according to whether the points a thru d are on the X' and Y' axes or not. When the ellipse is inclined, i.e., when the points a thru d are not on the X' and Y' axes, the regulation is effected by rotating the sensor head section 8 (shown in FIG. 6) in the magnetic bearing sensor unit 24, the vehicle 6 is turned 360° again, and the abovementioned processes (i) thru (iv) are carried out again. This process is repeated until the points a thru d are all on the respective X' and Y' axes as shown in FIG. 11 (B).

(vi) When the correction for the inclination of the ellipse has been completed as the result of the process (v), an offset correction process is then performed. Namely, an operational processing wherein the X and Y coordinate values of the central point $O'$ of the ellipse l₁₀ are subtracted from the X and Y coordinate values of the ellipse l₁₀ respectively is performed as follows:

$$\begin{cases} V'_X = V_X - O'_X \\ V'_Y = V_Y - O'_Y \end{cases}$$

As a result, the central point $O'$ of the ellipse l₁₀ and the origin O of the X and Y axes coincide with each other, although it is not shown.

(vii) Finally, a sensitivity correction process is effected to change the abovementioned ellipse l₁₀ into a circle l₁₁ shown in FIG. 11 (C). In other words, such coefficients h₁ and h₂ are determined that the maximum values of $V'_X$, $V'_Y$ after the offset correction by the process (vi) become a given value $h_O$ as shown by the following formula:

$$h_1 V'_{Xmax} = h_2 V'_{Ymax} = h_O$$

Then, final bearing signals $V''_X$, $V''_Y$ are obtained by carrying out an operational processing to correct the sensitivity of the abovementioned $V'_X$ and $V'_Y$ after the offset correction, represented by the following formulas:

$$\begin{cases} V''_X = h_1 V'_X \\ V''_Y = h_2 V'_Y \end{cases}$$

When the vehicle 6 is turned 360° after the abovementioned processes (i) thru (vii), the locus of the final corrected values $V'''_X$, $V'''_Y$ of the outputs $V_X$, $V_Y$ of the abovementioned magnetic bearing sensor unit 24 is displayed on the screen of the CRT 27, and this a locus will be a circle with a radius $h_O$, such as $l_{11}$ shown in FIG. 11 (C). Thus, the preferred embodiment shown in FIG. 10 is adapted to be able to accurately detect the direction of the terrestrial magnetism by automatically effecting corrections for offset, sensitivity, and the like employing the CPU 26.

As described above, according to the present invention, it is possible to provide a magnetic course detector capable of accurately detecting the bearing of the course of a traveling body independently of the position the magnetic bearing sensor is installed in the traveling body by making the magnetic bearing sensor rotatable and effecting offset and sensitivity corrections of its output.

We claim:

1. A magnetic course detector for detecting the bearing of the course of a traveling body, comprising: a magnetic bearing sensor mounted in the traveling body and adapted to detect the direction of terrestial magnetism and generate output voltages $V_x$, $V_y$ proportional to the magnetic field intensity; an offset correcting means adapted to apply a bias to the said outputs of the magnetic bearing sensor so that the biased outputs $V'_x$ and $V'_y$ are $V'_x = V_x - O'_x$ and $V'_y = V_y - O'_x$ where $O'_x$ and $O'_y$ are respective offset correction components determined in a calibration mode for the magnetic course detector; a sensitivity correcting means adapted to regulate the output levels of the magnetic bearing sensor so that the absolute values of the biased outputs $V'_x$ and $V'_y$ are equal in all directions; and a sensor rotating means adapted for rotation of the magnetic bearing sensor such that the magnetic sensor coincides with the direction of the highest magnetic permeability of the traveling body.

2. A magnetic course detector as defined in claim 1, wherein said magnetic bearing sensor is of a flux-gate type.

3. A magnetic course detector as defined in claim 1, wherein said sensor rotating means can rotate said magnetic bearing sensor to a direction which maximizes the absolute values of the detection outputs of said magnetic bearing sensor on the respective points of a circumference, which detection outputs are obtained by turning said traveling body 360° around said circumference.

4. A magnetic course detector as defined in claim 1, wherein said offset correcting means can apply a bias to the output of said magnetic bearing sensor so that the center of the locus obtained by turning said traveling body 360° coincides with a given coordinate origin on a display screen.

5. A magnetic course detector as defined in claim 4, wherein said offset correcting means is adapted to apply a bias voltage variable between a predetermined positive potential and a predetermined negative potential to the output of said magnetic bearing sensor via a variable resistor.

6. A magnetic course detector as defined in claim 1, wherein said sensitivity correcting means can correct the output of said magnetic bearing sensor so that the locus obtained by turning said traveling body 360° becomes a circle on the display screen for displaying the output of said magnetic bearing sensor.

7. A magnetic course detector as defined in claim 6, wherein said sensitivity correcting means is adapted to regulate the output level of said magnetic bearing sensor through a variable resistor with one end grounded.

8. The magnetic course detector of claim 1, further comprising means for computing values for $O'_x$ and $O'_y$ in a calibration mode wherein $$O'_x = \frac{V_{xmax} + V_{xmin}}{2} \text{ and } O'_y = \frac{V_{ymax} + V_{ymin}}{2},$$

and said offset correcting means is adapted to subtract said values from the sensor outputs.

9. The magnetic course detector of claim 1, further comprising means for displaying a locus of detection outputs obtained by turning said traveling body 360°, wherein the direction of the highest magnetic permeability of the traveling body corresponds to an inclination angle of said locus.

10. The magnetic course detector of claim 6, wherein said sensitivity correcting means is adapted to determine in a calibration mode the maximum values of $V'_x$ and $V'_y$ and corresponding sensitivity values to be multiplied thereto.

* * * * *

UNITED STATES PATENT AND TRADEMARK OFFICE
CERTIFICATE OF CORRECTION

PATENT NO. : 4,445,279

DATED : May 1, 1984

INVENTOR(S) : N. Tsushima, et al

It is certified that error appears in the above-identified patent and that said Letters Patent is hereby corrected as shown below:

In Claim 1, line 43, change "$V'_y = V_y - O'_x$" to

-- $V'_y = V_y - O'_y$ --.

Signed and Sealed this

Eighteenth Day of June 1985

[SEAL]

Attest:

DONALD J. QUIGG

*Attesting Officer*     *Acting Commissioner of Patents and Trademarks*